United States Patent

Schrader et al.

[15] 3,705,241
[45] Dec. 5, 1972

[54] FUNGICIDAL PROCESS EMPLOYING ORGANIC PHOSPHOROUS ACID ESTERS

[72] Inventors: Gerhard Schrader, Wuppertal-Cronenberg; Hans Scheinpflug, Leverkusen-Fettehenne, both of Germany; Herbert F. Jung, Tokyo; Shimpei Kuyama, Tokyo; Shigeo Kishino, Tokyo; Yasuo Yamada, Tokyo, all of Japan

[73] Assignee: Nihon Tokusha Noyaku Seizo Kabushiki Kaisha, Tokyo, Japan

[22] Filed: Oct. 20, 1970

[21] Appl. No.: 82,528

Related U.S. Application Data

[63] Continuation of Ser. No. 686,278, Nov. 28, 1967, abandoned.

[52] U.S. Cl. ..................................................424/223
[51] Int. Cl. ..................................................A01n 9/36
[58] Field of Search.........................................424/223

[56] References Cited

UNITED STATES PATENTS

| | | | |
|---|---|---|---|
| 2,769,743 | 11/1956 | Mattson | 424/222 |
| 2,861,912 | 11/1958 | Sallmann | 424/219 |
| 3,268,393 | 8/1966 | Wilson | 424/325 |

Primary Examiner—Albert T. Meyers
Assistant Examiner—Doris J. Funderburk
Attorney—Sherman and Shalloway

[57] ABSTRACT

Agricultural and horticultural fungicides of the formula

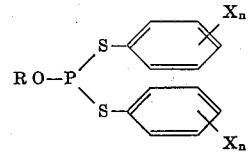

wherein R is selected from the group consisting of C1–4 alkyl and chloroethyl, X is selected from the group consisting of chlorine and methyl and $n$ is zero or one are especially useful for the control of the blast and sheath blight, which have been regarded from the past as serious diseases of rice, processes for the preparation of active ingredients thereof and method of the utilization thereof. These fungicides have good control effects and their active ingredients contain no heavy metals harmful to men and cattle, in contrast to the conventional fungicides heretofore applied for the same purpose which give such bad influence as direct and indirect toxicity to men and cattle owing to the presence of heavy metals such as mercury and arsenic.

16 Claims, No Drawings

FUNGICIDAL PROCESS EMPLOYING ORGANIC PHOSPHOROUS ACID ESTERS

This application is a continuation of application Ser. No. 686,278 filed Nov. 28, 1967 now abandoned.

The present invention relates to agricultural and horticultural fungicides whose active ingredients are organic phosphorous acid esters not containing heavy metals harmful to men and cattle, processes for the preparation of active ingredients thereof and method of the utilization thereof.

More particularly, the present invention relates to agricultural and horticultural fungicides containing a fungicidal amount of at least one compound selected from the group consisting of organic phosphorous acid esters represented by the following formula (1)

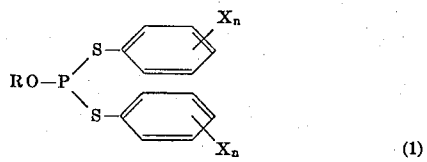

(wherein R stands for a member selected from the group consisting of alkyl groups and haloalkyl groups, X stands for a member selected from the group consisting of halogen atoms and alkyl groups and $n$ is a number selected from the group consisting of zero and 1), especially preferably organic phosphorous acid esters of said formula (1) wherein R stands for an alkyl group having one to four carbon atoms, X stands for a member selected from the group consisting of chlorine and methyl, and $n$ is a number selected from the group consisting of zero and 1 and organic phosphorous acid esters of said formula (1) wherein R stands for Cl—$CH_2CH_2$-, X stands for methyl and $n$ is a number selected from the group consisting of zero and 1 as active ingredients, processes for the preparation of said active ingredients and method of the utilization thereof.

For the control of blast (*Piricuralia oryzae*) and sheath blight (*Hypochnus sasakii*), important diseases of rice from the past, such compounds as phenyl mercuric acetate and methyl arsonic acid metal salts, etc. have been applied extensively due to their superior fungicidal efficacy and for economical reasons.

Of late, however, the application of organic mercury compounds to rice plant in its growing stage has been brought to light in view of giving bad influence to public health by their direct toxicity and indirect residual toxicity to the human body. Therefore, the development of agricultural chemicals not containing these heavy metals harmful to men and cattle and effective against the aforementioned rice diseases and cheap-priced has been earnestly desired.

We, the inventors, after testing biological activity of various organic phosphorous acid esters in order to solve the aforementioned problem, have discovered that novel organic phosphorous acid esters shown by the aforementioned general formula (1) were useful as agricultural and horticultural fungicides, though inferior in their insecticidal actions, and especially they had excellent efficacy against important rice diseases such as blast, Brown spot (ti *Cochliobolus miyabeanus*) and sheath blight and thus we have completed this invention.

The following Table 1 shows the compounds exemplified to be used in this invention.

TABLE 1

| Compound No. | Structural formula | Chemical name |
|---|---|---|
| 1 | $CH_3O-P(S-C_6H_4-CH_3)(S-C_6H_4-CH_3)$ | O-methyl-S,S-di(p-methylphenyl)dithiophosphite. |
| 2 | $C_2H_5O-P(S-C_6H_4-CH_3)(S-C_6H_4-CH_3)$ | O-ethyl-S,S-di(p-methylphenyl)dithiophosphite. |
| 3 | $C_2H_5O-P(S-C_6H_4-Cl)(S-C_6H_4-Cl)$ | O-ethyl-S,S-di(p-chlorophenyl)dithiophosphite. |
| 4 | n- (or i-) $C_3H_7O-P(S-C_6H_4-CH_3)(S-C_6H_4-CH_3)$ | O-n- (or i-) propyl-S,S-di(p-methylphenyl)dithiophosphite. |
| 5 | n- (or sec-) $C_4H_9O-P(S-C_6H_4-CH_3)(S-C_6H_4-CH_3)$ | O-n- (or sec-) butyl-S,S-di(p-methylphenyl)dithiophosphite. |
| 6 | $CH_3O-P(S-C_6H_5)(S-C_6H_5)$ | O-methyl-S-S-diphenyl dithiophosphite. |

Table I—Continued

| Compound No. | Structural formula | Chemical name |
|---|---|---|
| 7 | C₂H₅O—P(S—C₆H₅)₂ | O-ethyl-S,S-diphenyl dithiophosphite. |
| 8 | n- (or i-) C₃H₇O—P(S—C₆H₅)₂ | O-n- (or i-) propyl-S,S-diphenyl dithiophosphite. |
| 9 | N- (or sec-) C₄H₉O—P(S—C₆H₅)₂ | O-n- (or sec-) butyl-S,S-diphenyl dithiophosphite. |
| 10 | Cl—CH₂CH₂O—P(S—C₆H₅)₂ | O-(2-chloroethyl)-S,S-diphenyl dithiophosphite. |
| 11 | Cl—CH₂CH₂O—P(S—C₆H₄—CH₃)₂ | O-(2-chloroethyl) S,S-di(p-methylphenyl) dithiophosphite. |

The aforementioned compounds may be easily prepared by reacting an alkyl dihalogeno phosphorous acid ester represented by the following formula (2)

(2)

(wherein R stands for a member selected from the group consisting of alkyl groups and haloalkyl groups and Hal. stands for halogen atoms) with a compound represented by the following formula (3).

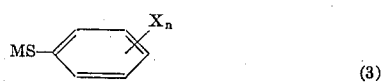

(3)

(wherein M stands for a member selected from the group consisting of hydrogen atom and alkali metal atoms, X stands for a member selected from the group consisting of halogen atoms and alkyl groups and $n$ is a number selected from the group consisting of zero and 1) in accordance with the following reaction scheme:

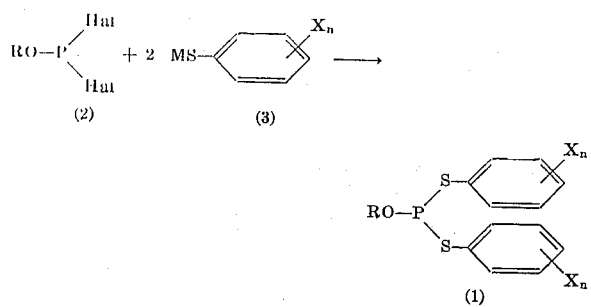

Said reaction suffices to react a compound of said formula (2) with a compound of said formula (3) in the optional presence of an organic solvent, however, it is preferable to carry out the reaction with heating.

Of the material dihalogeno phosphorous acid esters of said general formula (2), a compound wherein R is alkyl is easily synthesized by the known method using the corresponding alcohol and phosphorous trichloride. The following are its representative compounds and properties.

| Chemical name | Properties (melting point or boiling point) |
|---|---|
| O-methyl dichlorophosphorous acid ester | m.p. 95° – 96°C. |
| O-ethyl dichlorophosphorous acid ester | b.p. 54° – 60° C/100 mm Hg |
| O-propyl dichlorophosphorous acid ester | m.p. 143° – 145°C |
| O-butyl dichlorophosphorous acid ester | b.p. 49° – 50° C/11 mm Hg |

Of the material compounds of said general formula (2), a compound wherein R is haloalkyl may be obtained similarly except using a halo-substituted alcohol instead of said alcohol.

The representative compound is shown below

| Chemical name | Properties (boiling point.) |
|---|---|
| O-(2-chloroethyl) dichlorophosphorous acid ester | b.p. 70° – 75°C/5 – 10 mm Hg |

The reaction shown by said reaction scheme may employ a usually utilized acid-binding agent such as an organic base, for instance, triethylamine, benzyldimethylamine and pyridine or an inorganic base, for instance, sodium carbonate, potassium carbonate, sodium bicarbonate and potassium bicarbonate. As a compound of said formula (3), when substituted or unsubstituted thiophenol wherein M is a hydrogen atom is used, utilization of an acid binding-agent is recommended.

As the reaction temperature, normally a temperature within the range of 0°C. to 80°C. may be adopted, however, it is possible to carry out the reaction at a temperature higher or lower than said range if desired.

When as a reaction medium an organic solvent is utilized, a solvent, for instance, hydrocarbon (benzene, xylene, hexane), chlorinated hydrocarbon, ether and ketone may be utilized.

The reaction time is properly changed depending upon the reaction temperature, reaction components and other reaction conditions, however, normally a period of 1 – 10 hours is sufficient.

Further, as occasion demands it is possible to carry out the reaction in a nitrogen gas stream.

After completion of the reaction, the product may be obtained by filtering the produced salts, further washing the filtrate with water or an aqueous solution of carbonic acid and drying with sulfuric soda anhydride and then removing the solvent, thereafter purifying the product as occasion demands.

The compounds of said formula (1) obtained by said process are oily or solid substances generally insoluble in water, but soluble in an organic solvent, for instance, alcohol, benzene, xylene, hexane, ether, ketone, chlorinated hydrocarbon and hydrocarbon. When they are used, they may be utilized by various methods known in the agricultural and horticultural fields.

Namely, when the compounds of this invention are used as agricultural and horticultural fungicides, they are used diluted with water directly or in admixture with carriers and formulated into wettable powders, emulsifiable concentrates, dusts, granules or pastes by methods generally used in ordinary agricultural chemicals. As solid carriers are exemplified inactive materials such as talc, clay, kaolin, montmorillonite, diatomaceous earth, calcium carbonate, etc. As liquid carriers either solvents or even non-solvents which can disperse or dissolve the active ingredient by adjuvant can be used, e.g., alcohol, benzene, xylene, dimethyl naphthalene, aromatic naphtha, dimethyl formamide, surface active agent, etc.

They can be applied, for assuring their efficacy, in admixture with such adjuvants used for agricultural chemicals in general as spreader, emulsifier, wetting agent, adhesive agent, etc. Further, they can be applied in admixture with such insecticides, acaricides and nematocides as organo-phosphorus compounds, carbonate compounds, chlorinated compounds, dinitro compounds, such fungicides as organophosphorus compounds, organic sulfur, copper compounds, dithiocarbamates, dinitro compounds, antibiotics, such herbicides as substituted phenoxy compounds, carbamates, urea compounds, triazine compounds, chlorophenol, substituted diphenyl ether, anilide compounds and other agricultural chemicals and fertilizers.

In using the fungicides of the invention, in case of powder material, it can be directly dusted on the leaves or stems of plants or treated on the seed, and in case of emulsifier concentrate, it can be diluted with water etc. to a suitable concentration and may be applied on leaves and stems of plants by spraying it with a sprayer and in case of wettable powders they can be applied by spraying as a suspension of a suitable concentration with water and in case of granular formulation they can be sprinkled upon soil as such.

The fungicides of this invention are ordinarily used at a ratio of 25g – 24 100g, preferably 40g – 100g, especially 60g – 80g of the active ingredients per 10 ares, however, if desired they may be used in smaller or larger amounts. The used amounts are properly variable depending upon kind of the active ingredients, applying method, applying period, object of application or formulation of fungicides.

As aforementioned in contrast to the conventional fungicides heretofore applied for controlling the most important diseases of rice plant which have serious deficiency in that they are directly and indirectly toxic to men and cattle due to containing heavy metals such as mercury and arsenic, the fungicides of this invention completely overcome such deficiency due to harmful heavy metals, moreover, they have excellent fungicidal effects to rice diseases, above all, blast, Brown spot and sheath spot. As the active ingredient of this invention, a compound wherein R = alkyl and $n$ = o is preferable. In case $n$ is 1, a compound wherein X is alkyl is more effective than a compound wherein X is halogen.

The following Examples illustrate the process for the preparation of active ingredients of our invention, but supplements and specific compounds of the Examples are alterable and will not restrict our invention.

[ I ] Examples of preparing the active ingredients:

Example 1

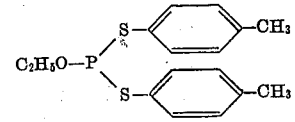

148 G of p-methyl thiophenol are dissolved in 600 ml of benzene. After having added 124g of triethylamine there are further added at 0° to 5°C. 90g of O-ethyl-dichlorophosphorous acid ester with stirring while passing nitrogen therethrough. The reaction mixture is stirred for 1 hour, then washed with water until it reacts neutrally. Then the benzene solution is dried over sodium sulfate and the solvent is distilled off. In this way, there are obtained 70g (38 percent of the theoretical) of a novel O-ethyl-S,S-di(p-methylphenyl)-dithiophosphite in the form of a pale yellow water-insoluble oily matter.

| Analysis: | P | S |
|---|---|---|
| Calculated for a molecular weight of 322: | 9.6 % | 19.9 % |
| Found: | 9.1 % | 20.2 % |

Example 2

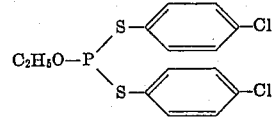

172 G of p-chlorothiophenol are dissolved in 600 ml of benzene. The solution is treated with 124g of triethylamine. Subsequently at 0° to 5°C there are added 90g of 0-ethyldichlorophosphorous acid ester while stirring and passing nitrogen through the solution. The reaction mixture is further stirred for 1 hour and then treated as described in Example 1. There are obtained 160g (73 percent of the theoretical) of O-ethyl-S,S-di(p-chlorophenyl)-dithiophosphite in the form of a pale yellow water-insoluble oily matter.

Example 3

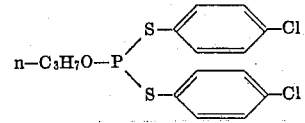

124 G of triethylamine are added to a solution of 172g of p-chlorothiophenol in 600 ml of benzene. Then 97g of O-n-propyldichlorophosphorous acid ester are added to the solution at 0° to 5°C. with stirring and passing through nitrogen. The reaction mixture is further stirred for 1 hour and then treated as described in Example 1. A novel O-n-propyl-S,S-di(p-chlorophenyl)-dithiophosphite is obtained as a pale yellow water-insoluble oily matter. The yield amounts to 148g (65 percent of the theoretical).

Analysis:
Calculated for a molecular weight of 377:   P 8.2%   S 17.0%   Cl 18.8%
Found:   8.4%   17.2%   18.3%

Example 4

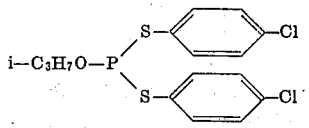

172 G of p-chlorothiophenol are dissolved in 600 ml of benzene. 124 g of triethylamine are added. Then 97g of O-isopropyldichlorophosphorous acid ester are added to the solution at 0° to 5°C with stirring and passing through nitrogen. The reaction mixture is further stirred for 1 hour and then treated as described in Example 1. In this way there are obtained 145g (77 percent of the theoretical) of the novel O-isopropyl-S,S-di(p-chlorophenyl)-dithiophosphite in the form of colorless needles.

Analysis:
Calculated for a molecular weight of 377:   P 8.2%   S 17.0%   Cl 18.8%
Found:   8.4%   17.3%   18.6%

Example 5

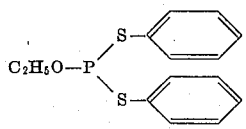

The mixed solution of 22g of thiophenol, 20g of triethylamine and 100 ml of benzene is added dropwise into a solution wherein 14.7g of O-ethyldichloro phosphorous acid ester are dissolved in 200 ml of benzene at 10° – 15°C. After the completion of dropping, stirring is further continued for 3 hours at 10°C and the formed amine salt is filtered. The filtrate is washed with water and 1 percent sodium carbonate aqueous solution twice and dried with sulfuric soda anhydride. When the benzene is distilled off and dried under a reduced pressure (0.05 mm Hg) at 100°C. 26.5g of light yellow and oily O-ethyl-S,S-diphenyl dithiophosphite are obtained.

Example 6

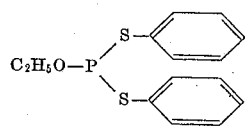

205 G of triethylamine are added into a solution wherein 220g of thiophenol are dissolved in 1,000 ml of benzene. Into this solution the solution of 100 ml of benzene in which 150g of O-ethyldichloro phosphorous acid ester are dissolved is added dropwise at 0° – 5°C. gradually with stirring. After the reaction mixture is stirred for 2 hours more at the room temperature, it is washed with ice water and the benzene solution is separated. After the organic layer is dried over sulfuric soda anhydride and the solvent is distilled off under a reduced pressure, 265g (90 percent of theoretical value) of light yellow, water-insoluble and oily O-ethyl-S,S-diphenyl dithiophosphite are obtained, boiling at 134°C. (0.01 mm Hg)

Example 7

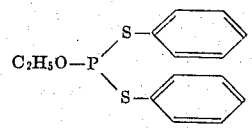

13.2 G of sodium salt of thiophenol are added into 200 ml of methyl ethyl ketone. Into this solution, 7.3g of O-ethyl dichloro phosphorous acid ester are added dropwise with stirring. After continuing the stirring for eight hours at 60°C, the formed inorganic salt is filtered. Methyl ethyl ketone is distilled off and the residue is dissolved in ether. After being washed with a 1 percent sodium carbonate aqueous solution and water, ether solution is dried over sodium sulfate anhydride and ether is distilled off. Then 11.5g of O-ethyl-S,S-diphenyl dithiophosphite are obtained.

Example 8

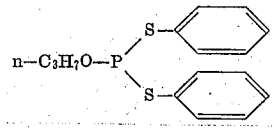

8 G of O-n-propyl dichloro phosphorous acid ester are added dropwise into a solution wherein 11g of thiophenol and 10g of triethyl amine are dissolved in 200 ml of benzene at room temperature.

After having stirred for an hour, the mixture is refluxed for 2 hours. After cooling, amine salt is filtered and further treated as described in Example 1. Under the reduced pressure (0.05 mm Hg) at 100°C. 13.5g of undistillable oily O-n-propyl-S,S-diphenyl dithiophosphite are obtained.

Example 9

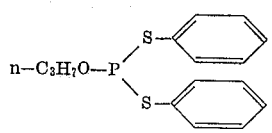

124 G of triethyl amine are added into a solution wherein 132g of thiophenol are dissolved in 600 ml of benzene. To this solution 7g of O-n-propyl dichloro phosphorous acid esters are added at 0° – 5°C with stirring and passing through nitrogen gas. After the reaction mixture is stirred for an hour, it is washed with water until it reacts neutrality. Then the benzene solution is dried over sulfuric soda anhydride and the solvent is distilled off. Then 147g (80 percent of theoretical value) of light yellow, water-insoluble and oily O-n-propyl-S,S-diphenyl dithiophosphite are obtained.

Analysis:
Calculated for a molecular weight of 322:   P 10.1%   S 20.8%
Found:   9.6%   21.0%

Example 10

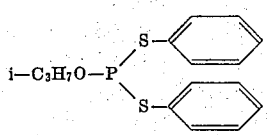

124 G of triethyl amine are added into a solution wherein 132g of thiophenol are dissolved in 600 ml of benzene. Into this solution 97 g of O-isopropyl phosphorous acid ester are added dropwise at 0° – 5°C with stirring. Further having stirred for an hour, the reaction mixture is treated in the manner as described in Example 1 and then 150g (81 percent of theoretical value) of yellow, water-insoluble and oily O-iso-propyl-S,S-diphenyl dithiophosphite boiling at 118°C/0.01 mm Hg are obtained.

Example 11

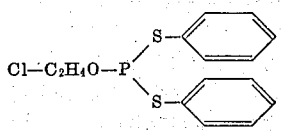

A mixed solution of 22g of thiophenol, 20g of triethyl amine and 100 ml of benzene is added dropwise into solution wherein 18.1g of O-(2-chloroethyl)dichloro dichloro phosphorous acid ester are dissolved in 200 ml of benzene at 10° – 15°C.

After the completion of dropping, stirring is further continued for 3 hours at 20°C and the formed amine salt is filtered. The filtrate is treated in the manner as described in Example 1 and then 24.7g of light yellow and oily O-(2-chloroethyl)-S,S-diphenyl dithiophosphite are obtained.

The following Examples illustrate the preparation of fungicides and also the method of using the same will be explained in the following examples.

It should be noted that the additives and active ingredients may be changed over a wide range.

[ II ] Preparation of fungicides (compositions):

Example 1

50 Parts of O-ethyl-S,S-di(p-methylphenyl) dithiophosphite, 48 parts of clay and 2 parts of emulsifier Sorpol W-150 (active ingredient polyoxyethylene alkylarylether, Toho Kagaku Kogyo K.K., Japan) are formulated into a wettable powder by crushing and mixing and applied diluted with water. In case of using, the wettable powder was suspended in water and sprayed on the leaves and stems of paddy field rice plant infected by rice blast (*Piricularia oryzae*) to destroy the disease.

Example 2

3 Parts of O-ethyl-S,S-di(p-chlorophenyl) dithiophosphite and 97 parts of mixture of talc and clay are formulated into a dust by crushing and mixing and applied as it is.

Example 3

25 Parts of O-ethyl-S,S-diphenyl dithiophosphite, 25 parts of O-ethyl O-cyclohexyl S-(p-chlorophenyl) thiophosphate, 30 parts of xylene and 20 parts of emulsifier Sorpol 2020 (active ingredient polyoxyethylene alkylarylether, Toho Kagaku Kogyo K.K., Japan) are formulated into an emulsifiable concentrate by mixing and stirring and applied diluted with water.

Example 4

50 Parts of O-propyl-S,S-diphenyl dithiophosphite, 48 parts of clay, 2 parts of emulsifier Sorpol W-150 (trade name of the product of Toho Kagaku Kogyo K.K., Japan) are formulated into a wettable powder by crushing and mixing and applied diluted with water.

Example 5

30 Parts of O-ethyl-S,S-diphenyl dithiophosphite, 50 parts of xylene and 20 parts of emulsifier Sorpol 2020 (trade name of the product of Toho Kagaku Kogyo K.K., Japan) are formulated into an emulsifiable concentrate by mixing and stirring and applied diluted with water.

Example 6

2 Parts of O-ethyl-S,S-diphenyl dithiophosphite, 2 parts of O,O-dimethyl O-(4-methylthio-m-tolyl) phosphorothioate and 96 parts of mixture of talc and clay are formulated into dust by crushing and mixing and applied as it is. The powder may be directly dusted by means of a duster on the spots where rice blast ( Piricularia oryzae), sheath blight (*Pellicularia sasakii*) or rice stem borer have been infected to destroy the disease.

Example 7

50 Parts of O-(2-chloroethyl)-S,S-di(p-methylphenyl) dithiophosphite, 30 parts of xylene and 20 parts of emulsifier Sorpol 2020 (trade name of the product of Toho Kagaku Kogyo K.K., Japan) are formulated into an emulsifiable concentrate by mixing and stirring, and applied after diluted with water.

Example 8

2 Parts of O-(2-chloroethyl)-S,S-diphenyldithiophosphite and 98 parts of mixture of talc and clay are formulated into a dust by crushing and mixing, and applied as it is.

Example 9

A solution of 5 parts of O-ethyl-S,S-diphenyl-dithiophosphite in a solvent is sprayed over 95 parts of vermiculite to form a granular preparation, and is sprinkled over soil as such.

[ III ] Applying Example:

Some experimental results of fungicidal effect of the compounds of the present invention are shown in the following Tables II, III.

Testing methods:

a. Tests against blast (Pot test)

Paddy rice (Jukkoku variety) was cultivated in pots with the diameters of 12 cm and the suspensions of test chemicals were sprayed on rice plants at their young ear forming period. From the next day the treated rice plants were kept in a green house at a temperature of 25°C for 48 hours. During that time the suspensions of spores of rice blast pathogen were sprayed for inoculation twice. After the inoculated rice plants were kept in the green house for 7 days, the disease attack rates per pot were classified in the degrees from 0 (no attack) to 5 (heavy attack) and valued. The controlling values of the testing chemicals were calculated out by the index numbers obtained from the disease attack rates to paddy rice in the treated plots against those in the control plots.

b. Tests against sheath blight (Pot test)

The suspensions of test chemicals were applied to paddy rice seedlings (Kinmaze variety) cultivated in pots with the diameters of 12 cm for 14 days after their sowing, and then the suspension of spores of sheath blight germs cultured on the barley medium for 10 days was sprayed for inoculation at the part close to the earth. They were kept at high temperature and humidity for 5 days for accelerating disease attack. As in the case of blast, the disease attack rate per pot was classified in degrees from 0 (no attack) to 5 (heavy attack) and valued. Then the controlling values of test compounds were calculated and compared.

c. Test against plant pathogen (agar dilution method)

The compounds of this invention were mixed in the agar culture medium of potato making the concentration as prescribed. After the agar was poured into schales with the diameters of 9 cm and hardened, pathogen was inoculated. After having been cultured at 27°C for 4 days, the growth condition of pathogen was investigated and the lowest concentration of growth inhibition was sought.

TABLE II

| Compounds No.: | Concentration of act. ing. (p.p.m.) | Blast Rate of attack | Blast Controlling value | Sheath blight Rate of attack | Sheath blight Controlling value |
|---|---|---|---|---|---|
| 1 | 200 | 2.0 | 60 | 2.0 | 60 |
|   | 500 | 1.0 | 80 | 0.3 | 94 |
| 2 | 200 | 1.8 | 64 | 3.0 | 40 |
|   | 500 | 0.8 | 84 | 0.5 | 90 |
| 3 | 200 | 2.0 | 60 | 3.0 | 40 |
|   | 500 | 1.2 | 76 | 1.5 | 70 |
| 4 | 200 | 2.2 | 56 | 3.0 | 40 |
|   | 500 | 2.0 | 60 | 1.5 | 70 |
| 5 | 200 | 2.5 | 50 | 3.0 | 40 |
|   | 500 | 1.5 | 70 | 1.8 | 64 |
| 6 | 200 | 2.5 | 50 | 1.8 | 64 |
|   | 500 | 0.5 | 90 | 0.5 | 90 |
| 7 | 200 | 0.5 | 90 | 2.5 | 50 |
|   | 500 | 0 | 100 | 0.3 | 94 |
| 8 | 200 | 0.8 | 84 | 2.8 | 44 |
|   | 500 | 0.5 | 90 | 1.2 | 76 |
| 9 | 200 | 2.2 | 56 | 3.5 | 30 |
|   | 500 | 1.2 | 76 | 1.8 | 64 |
| 10 | 200 | 1.0 | 80 | 3.0 | 40 |
|   | 500 | 0 | 100 | 2.0 | 60 |
| 11 | 200 | 2.5 | 50 | 3.5 | 30 |
|   | 500 | 1.5 | 70 | 2.0 | 60 |
| Kitazin (marketed good-comparison) | 200 | 2.3 | 54 | 4.5 | 10 |
|   | 500 | 0.5 | 90 | 2.0 | 60 |
| Phenyl mercuric acetate (marketed good-comparison) | 42 | 0.6 | 88 |   |   |
| Urbazide (comparison) | 80 |   |   | 0.8 | 84 |
| Non-treatment |   | 5.0 | 0 | 5.0 | 0 |

TABLE III

Concentration of pathogen growth inhibition by agar dilution method (p.p.m.)

| Compounds No. | Piricularia oryzae Cavara | Cochliobolus miyabeanus | Hypochnus sasakii | Alternaria kikuchiana Tanaka (pear) | Mycosphaerella melonis (cucumber) | Fusarium oxysporium |
|---|---|---|---|---|---|---|
| 2 | 10 | 25 | 100 | 100 | 50 | 100 |
| 3 | 10 | 50 | 100 | 100 | 100 | >100 |
| 7 | 10 | 25 | 25 | 50 | 50 | 50 |
| 8 | 10 | 25 | 50 | 100 | 100 | 100 |
| 10 | 25 | 100 | 100 | 200 | 100 | >100 |

NOTE:
1. The numbers of compounds in the Tables II, III are the same as those of the aforementioned compounds exemplified in Table I.
2. Kitazin: O,O-diethyl-S-benzylphosphorothiolate.
3. Urbazide: Methylarsin-bis-dimethyldithiocarbamate.

What is claimed is:

1. A process for controlling blast (*Piricuralia oryzae*), brown spot (*Cochliobolus miyabeanus*) and sheath blight (*Hypochnus sasakii*) of rice plants which comprises applying to a rice plant, rice seed or soil an effective amount of an agricultural and horticultural fungicide composition consisting essentially of an agriculturally and horticulturally acceptable carrier and an organic phosphorous acid ester of the formula:

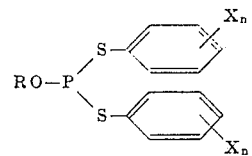

(1)

wherein R represents a member selected from the group consisting of alkyl of from one to four carbon atoms and a chloroethyl group, X represents a member selected from the group consisting of chlorine and methyl, and $n$ is zero or 1, said phosphorous acid ester being applied in an amount of 25–100 grams per 10 ares.

2. The process of claim 1 wherein the ester is O-methyl-S,S-di(p-methylphenyl) dithiophosphite.

3. The process of claim 1 wherein the ester is O-ethyl-S,S-di(p-methylphenyl) dithiophosphite.

4. The process of claim 1 wherein the ester is O-ethyl-S,S-di(p-chlorophenyl) dithiophosphite.

5. The process of claim 1 wherein the ester is O-methyl-S,S-diphenyl dithiophosphite.

6. The process of claim 1 wherein the ester is O-ethyl-S,S-diphenyl dithiophosphite.

7. The process of claim 1 wherein the ester is O-(2-chloroethyl)-S,S-diphenyl dithiophosphite.

8. The process of claim 1 wherein the ester is O-(2-chloroethyl)-S,S-di(p-methylphenyl) dithiophosphite.

9. The process of claim 1 wherein the ester is O-n-propyl-S,S-di(p-methylphenyl) dithiophosphite.

10. The process of claim 1 wherein the ester is O-n-butyl-S,S-di(p-methylphenyl) dithiophosphite.

11. The process of claim 1 wherein the ester is O-n-propyl-S,S-diphenyl dithiophosphite.

12. The process of claim 1 wherein the ester is O-n-butyl-S,S-diphenyl dithiophosphite.

13. The process of claim 1 wherein the ester is O-i-propyl-S,S-di(p-methylphenyl) dithiophosphite.

14. The process of claim 1 wherein the ester is O-sec.-butyl-S,S-di(p-methylphenyl) dithiophosphite.

15. The process of claim 1 wherein the ester is O-i-propyl-S,S-diphenyl dithiophosphite.

16. The process of claim 1 wherein the ester is O-sec.-butyl-S,S-diphenyl dithiophosphite.

* * * * *